United States Patent [19]

Fulkerson et al.

[11] 4,306,406
[45] Dec. 22, 1981

[54] GRASS TRIMMING APPARATUS

[76] Inventors: David W. Fulkerson, 8360 W. Six Mile Rd., Northville; Lawrence W. Smith, 26950 Taft Rd., Novi, both of Mich.

[21] Appl. No.: 134,490

[22] Filed: Mar. 27, 1980

[51] Int. Cl.³ ............................................. A01D 55/18
[52] U.S. Cl. ...................................... 56/13.5; 56/255; 56/DIG. 12
[58] Field of Search ....................... 56/13.5, 13.6, 255, 56/DIG. 10, DIG. 13, DIG. 12

[56] References Cited

U.S. PATENT DOCUMENTS

| 3,665,691 | 5/1972 | Vaughan | 56/255 |
| 3,948,026 | 4/1976 | Whitechester | 56/255 |
| 4,141,201 | 2/1979 | Christensen | 56/121.42 |
| 4,212,147 | 7/1980 | Werner | 56/13.6 |

FOREIGN PATENT DOCUMENTS

| 531207 | 12/1940 | United Kingdom | 56/DIG. 13 |
| 531786 | 1/1941 | United Kingdom | 56/DIG. 13 |

Primary Examiner—Robert A. Hafer
Attorney, Agent, or Firm—Harness, Dickey & Pierce

[57] ABSTRACT

This disclosure relates to a grass trimming apparatus which may be used for trimming and cleaning grass on cemetary grave markers or the like. The grass trimming apparatus of the present invention basically comprises a grass lifting device such as a rotating brush which digs loose dirt and stones and lifts grass and thatch-like material up and off the face and peripheral edges of flush mounted grave markers so that a sequentially mounted grass cutting device can trim the grass lifted by the brush. The rotating brush is movable from a downward operative position to an upward position for travel between various grave markers in the cemetary, and may be detachably mounted for service. The grass cutting device or mower deck is similarly mounted to be movable between operative and travel positions. The entire grass trimming apparatus of the present invention may be mounted adjacent an associated vehicle such as a tractor which may be used to provide the necessary power, be it hydraulic or otherwise, to operate the present device. In such case, the entire grass trimming apparatus would be able to be transpositioned between an operating orientation alongside the vehicle, to a transport or storage position disposed rearwardly of the vehicle.

12 Claims, 12 Drawing Figures

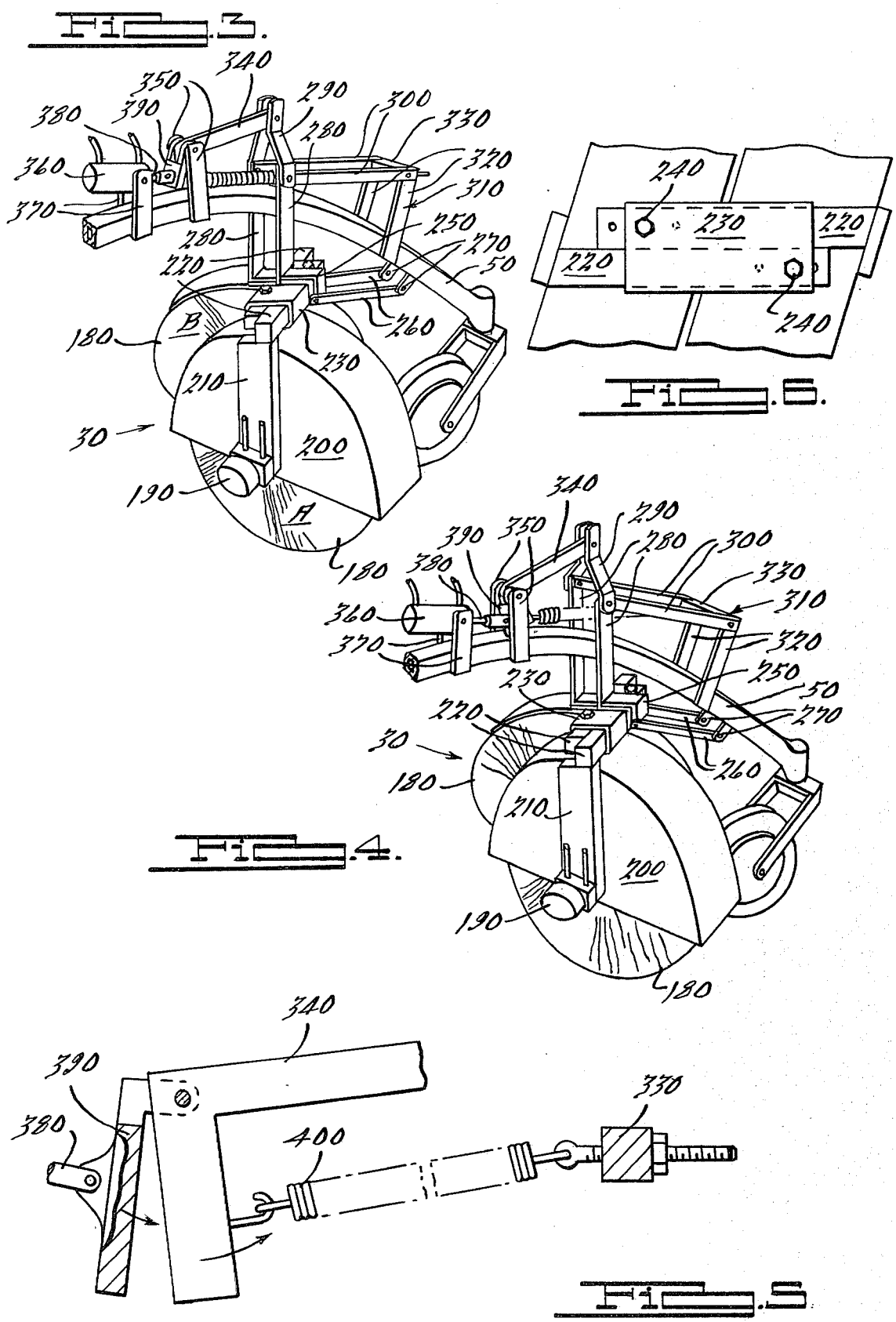

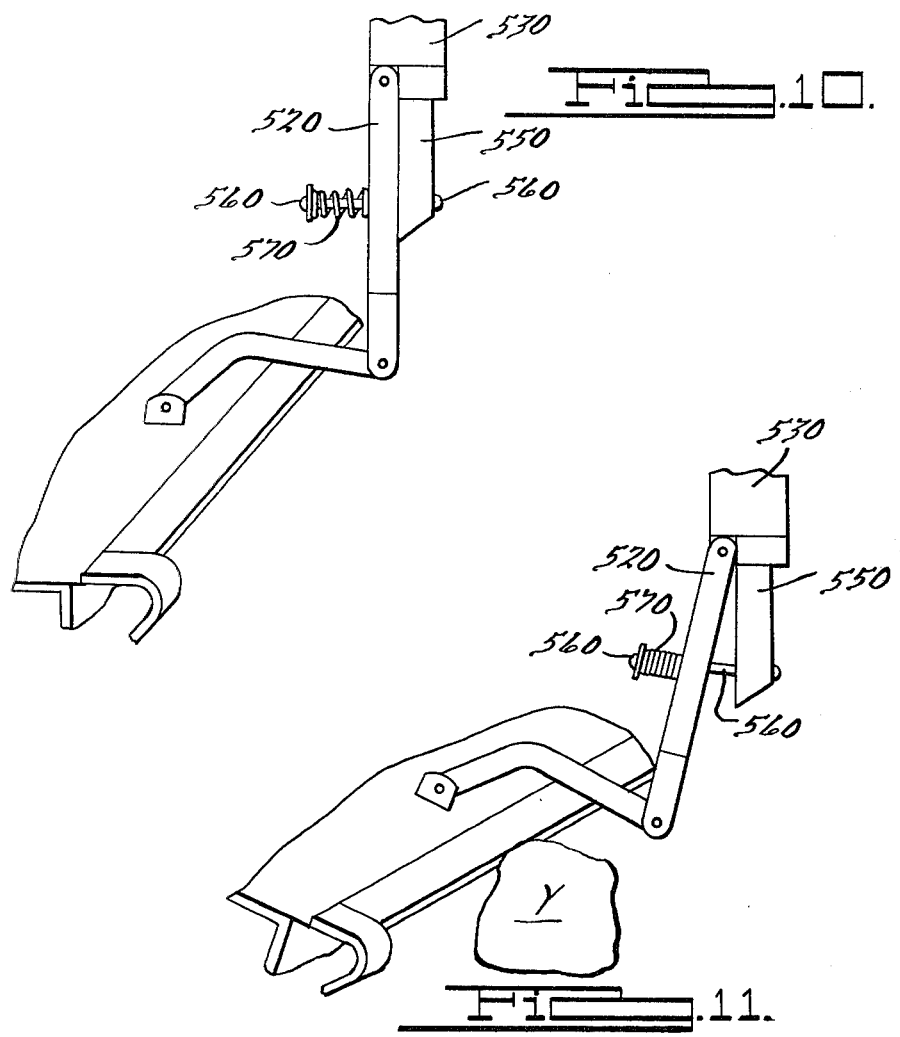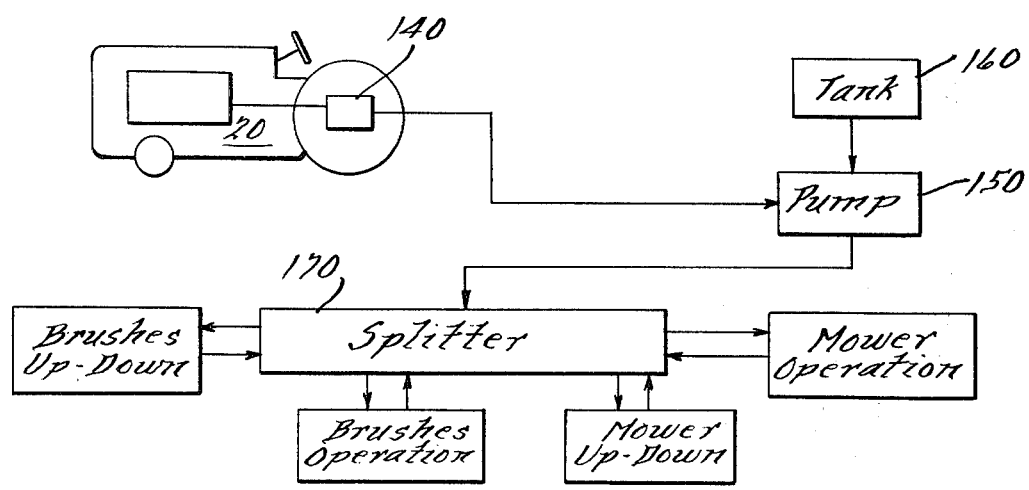

GRASS TRIMMING APPARATUS

BACKGROUND AND SUMMARY OF THE INVENTION

The present invention pertains primarily to cutting devices for vegetation or the like, and more particularly to grass trimming devices.

Generally, devices for cutting or trimming grass or like vegetation comprise a rotating cutting blade mounted within a housing of some type and movable along the ground by way of at least one axle and an associated pair of wheels. Devices of this general type provide a cutting path in which all the subject vegetation or grass is trimmed to a single height. Normally, the cutting mechanism is either in a totally operative or totally shut down mode with no provision for neutral movement between cutting locations. In addition, any vegetation or grass which is below the level of the rotating cutting blade, due to the fact that it is trampled, matted, or growing in other than a vertical direction, is not cut.

Maintaining the grounds of cemetaries presents a grass trimming situation in which most of the usually accepted drawbacks of conventional lawn mowers, such as those referred to above, cannot be tolerated. This is especially true in cemetaries containing grave markers having horizontal top surfaces which are mounted flush or level with the ground. For example, since such grave markers are positioned below the normal cutting height for lawn mowers, any grass growing on or around the grave marker which is below this prescribed lawn mower cutting height for whatever reason, will not be cut. Such uncut grass presents a rather messy appearance to the normally well-manicured and properly trimmed grave marker. If an attempt is made to lower the mower on or around the edges of the grave marker, the surrounding grass may inadvertently be scalped if the mower is not repositioned at the appropriate time. Needless to say, trimming each and every such grave marker by hand in a large cemetary would be a monumental if not impossible task, and even more importantly, is totally contrary to the present efficient, energy-conscious use of power lawn mowers and tractors for such grounds keeping chores.

Accordingly, it is a principle object of the present invention to provide a grass trimming apparatus which is able to easily trim and clean grass on cemetary grave markers.

In general, the grass trimming apparatus according to the present invention comprises both a grass lifting device adapted to lift grass being trimmed and a grass cutting device mounted sequentially to said grass lifting device. For use in trimming grass around flush mounted grave markers or the like, a pair of counter-rotating brushes may be used to both clean the top surface of the grave marker and also to lift grass up and off the peripheral edges of the grave marker. A sequentially mounted rotary mower would then cut the grass which has been lifted by the brushes. The grass trimming apparatus may be attached to a tractor and be hydraulically operated so as to enable movement of either or both devices, or the entire apparatus from their normal operating positions to travel or non-operating positions. In addition to providing an apparatus which enables efficient cemetary upkeep, the present invention also enables cleaning and to some extent buffing of flush mounted grave markers, which normally are just passed over without any consideration for any grass which may be growing over and around the grave marker.

Additional advantages and features of the present invention will become apparent from a reading of the detailed description of the preferred embodiment which makes reference to the following set of drawings in which:

BRIEF DESCRIPTION OF THE DRAWINGS

FIG. 3 is a view showing a grass lifting device used in accordance with the present invention in a downward operative position;

FIG. 4 is a view showing the grass lifting device of FIG. 3 in an upward position for travel between grave markers;

FIG. 5 is a view of a counterbalance mechanism used with the grass lifting device of FIG. 3;

FIG. 6 is a view showing the detachability feature of the grass lifting device of FIG. 3;

FIG. 10 is a view of a shock absorbing mechanism used with the grass cutting device of FIG. 7;

FIG. 11 is another view of the shock absorbing mechanism of FIG. 10 shown in engagement with an obstacle; and FIG. 12 is a schematic representation of a hydraulic system which may be used to provide power for the present invention.

DESCRIPTION OF THE PREFERRED EMBODIMENT

Figure 1:
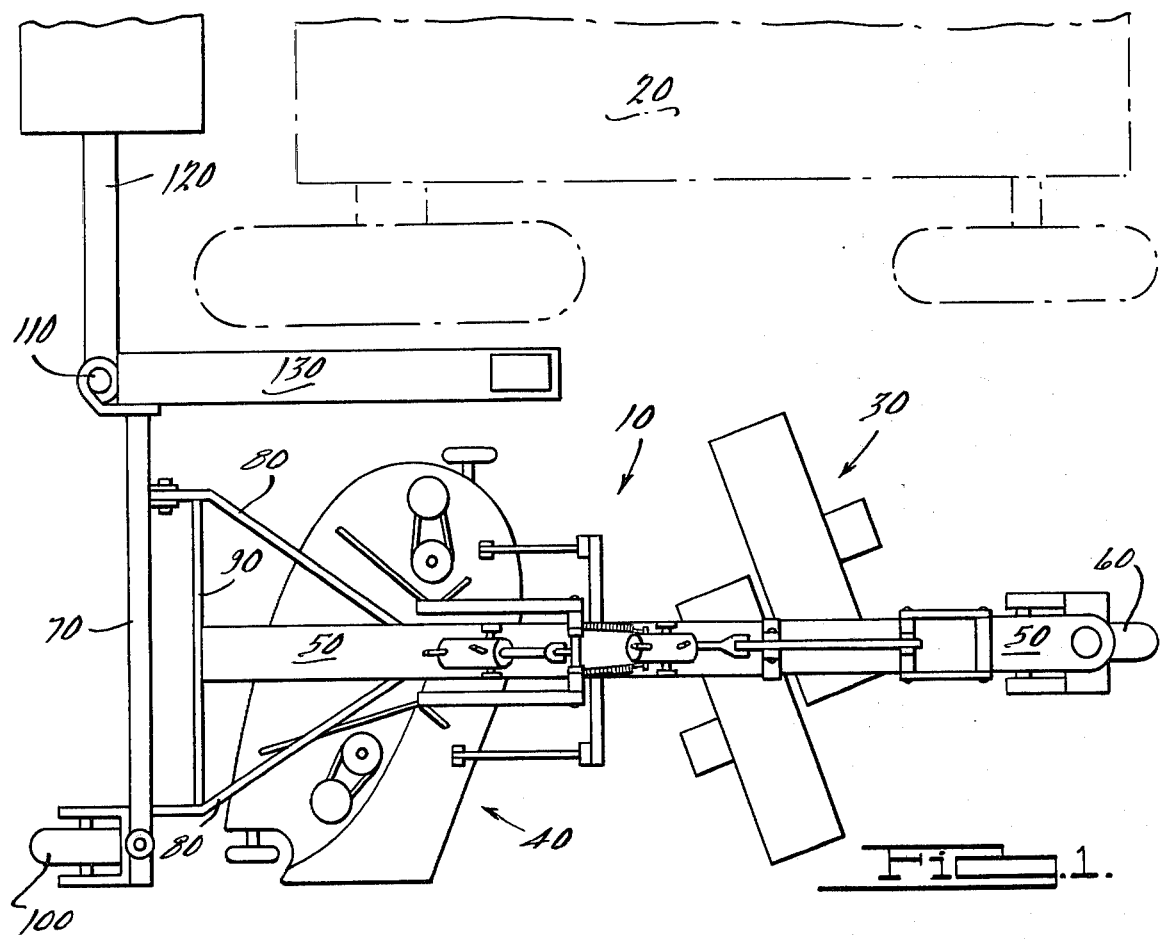
FIG. 1 is a plan view showing a tractor having a grass trimming apparatus made in accordance with present invention attached thereto.

Referring now to the drawings wherein the showings are for the purpose of illustrating a preferred embodiment of the invention only and are not for the purpose of limiting the invention, FIG. 1 shows a grass trimming apparatus 10 made in accordance with the present invention shown mounted adjacent an associated vehicle or tractor 20. The grass trimming apparatus 10 consists of a grass lifting device 30 and a grass cutting device 40. Both the grass lifting device 30 and the grass cutting device 40 are mounted on a central backbone 50, which is generally arcuate in shape and extends from the front of the grass trimming apparatus where a front guide wheel 60 is mounted, to the rear of the apparatus where the backbone 50 is attached to a horizontal frame member 70 by way of support bars 80 and cross member 90. Frame member 70 has a rear guide wheel 100 on its outer end and a pivot 110 on its end adjacent the tractor 20, which allows pivotal movement of the entire grass trimming apparatus 10 about a rear mounting member 120 on the associated tractor 20. The central backbone 50 as well as virtually all of the other structural members in this preferred embodiment of the present invention are made from steel, although other similar materials are contemplated.

FIG. 1 shows the grass trimming apparatus of the present invention in its normal operating position alongside or parallel to tractor 20. However, the entire apparatus may be manually pivoted to a transport or storage position behind the trailer. The latter position allows both the tractor and rearwardly disposed grass trimming apparatus to be driven onto a trailer for travel between job sites. The grass trimming apparatus may be locked in either position by using a locking pin or other similar device.

In the interest of making the present application clearer and more understandable, and in the interest of keeping the drawings from becoming unnecessarily cluttered, none of the hydraulic lines, hoses, valves, etc., which are used in this preferred embodiment of the present invention are shown or specifically referred to herein. However, it is to be understood that any hydraulically operated equipment referred to herein has all the necessary feed lines, power controls, etc., to make it operational. Such hydraulic plumbing or circuitry is believed to be well within the expertise of those skilled in the art. In this regard, and as will be more fully explained hereinafter, the tractor 20 furnishes the hydraulic power used to operate the present invention, and thus has most of the necessary hydraulic equipment mounted on or around it. It should also be appreciated that although hydraulic power is specified in this preferred embodiment, other forms of power and/or control may be acceptable and are believed to be well within the expertise of those skilled in the art.

Figure 2:
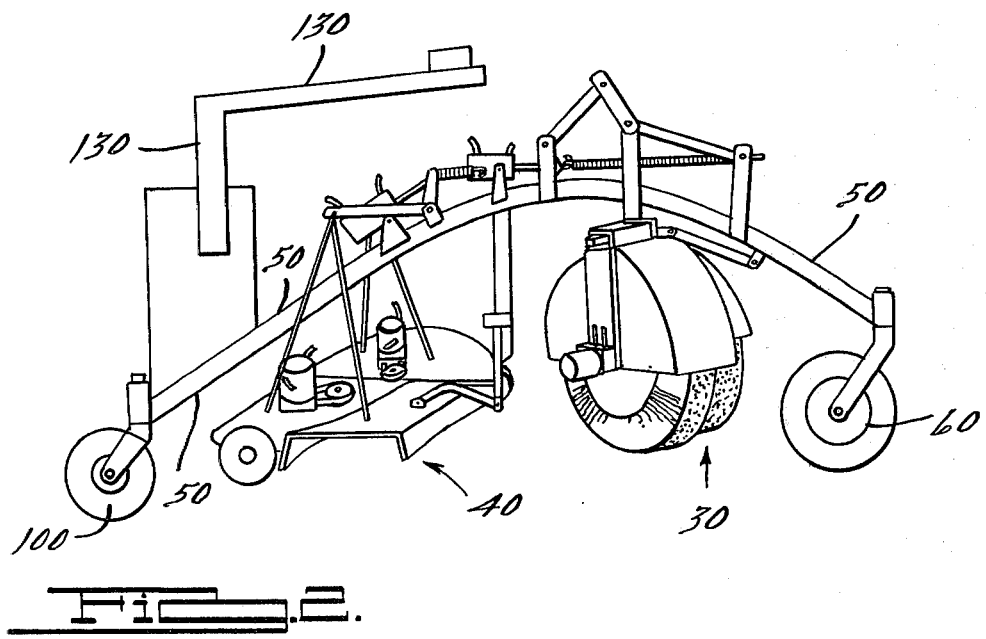
FIG. 2 is a side elevation view of the grass trimming apparatus of FIG. 1.

Referring now to both FIGS. 1 and 2, connected to the top of the rear mounting member 120 is a mass of hydraulic lines, hoses, valves, etc., all of which are mounted on a generally L-shaped mounting member 130. These hydraulic lines and the like extend from the tractor 20 to both the grass lifting device 30 and the grass cutting device 40, each of which is hydraulically operated and controlled. FIG. 12 gives a schematic representation of the hydraulic system used with the present invention and generally comprises a conventional power take-off 140 on the transmission of the tractor 20, which is connected to a hydraulic pump 150 and a fluid reservoir tank 160. The remaining hydraulic plumbing or circuitry such as the manifold or splitter 170 is mounted on or around the L-shaped mounting member 130. The splitter 170 allows for control and operation of both the grass lifting device 30 and grass cutting device 40, as will be more fully explained hereinafter.

Referring now to FIGS. 3 through 6, the grass lifting device 30 used in accordance with the present invention is shown. The grass lifting device 30 comprises a pair of brushes 180 which are mounted on the central backbone 50 of the grass trimming apparatus of the present invention. Each of the brushes 180 is driven by a hydraulic motor 190 which is positioned on the outer surface of a respective fender 200 and vertical support member 210. Each of the vertical support members 210 is attached to a respective cross bar 220, both of which cross bars are detachably and slidably mounted in side by side relationship in connector sleeve 230. As best seen in FIG. 6, each of the cross bars 220 overlaps a considerable portion of the side surface of the adjoining cross bar and extends through the connector sleeve 230 so that a portion of each cross bar is exposed beyond the lateral extent of the connector sleeve 230. A locking pin 240 is used to keep the cross bars 220 secured in position in the connector sleeve 230 during operation of the present invention. When locking pins 240 are removed, the cross bars 220 are free to slide out of the connector sleeve 230 to enable access to the inner portions of the brushes 180 for service, cleaning, removal or the like. Additional holes may be provided through connector sleeve 230 for cross bars 220 and locking pins 240, to enable adjustment of the brushes 180 for wider gravestones.

A mounting bracket 250 is welded on to the upper surface of connector sleeve 230 and is connected to the central backbone 50 of the present invention by way of horizontal members 260. Horizontal members 260 are pivotally connected to the mounting bracket 250 at one end and are pivotally connected to mounting tabs 270 on the other end, with mounting tabs 270 being welded on to the central backbone 50. This construction allows floating movement of the brushes 180 relative to the backbone 50.

Mounting bracket 250 is vertically connected via two hanger members 280 to a yoke assembly 290. The hanger members 280 are also pivotally connected to respective connecting arms 300 which are in turn pivotally connected to mount 310. Mount 310 is welded on to the top side of backbone 50 to stiffen it in an almost vertical position for more effective performance, and is generally in the shape of an inverted U with connecting arms 300 being pivotally connected at either side to the vertical sides 320 of the mount 310, and with a cross bar 330 extending therebetween. Yoke assembly 290 is pivotally connected at its upper narrow end to an L-shaped arm 340 which in turn is pivotally connected between mounting bars 350 which are welded on to the top side of the central backbone 50. A hydraulic cylinder 360 is pivotally mounted above the central backbone 50 via mounting tabs 370. This hydraulic cylinder 360 is preferably of the double-acting type such that the cylinder contains two supply lines, one supplying pressurized fluid to the cylinder while the other is exhausting fluid, and vice versa. A piston rod 380 extends from the hydraulic cylinder 360 to connect with rod mounting bracket 390 which is pivotally connected between mounting bars 350 adjacent L-shaped arm 340. As best seen in FIGS. 4 and 5, a counterbalance mechanism comprised of a long coil spring 400 extends between the L-shaped arm 340 and the cross bar 330. This mechanism serves to control the weight on the brushes 180 since when piston rod 380 is fully retracted, spring 400 maintains tension on L-shaped arm 340, so as to lighten the weight of the brushes to the ground, and allow floating action of the brushes.

In operation, the grass lifting device 30 used in accordance with the present invention is hydraulically controlled by the driver of the tractor 20. FIG. 3 shows the brushes 180 in a downward operative position, in which case hydraulic motors 190 would normally be operating to cause the brushes to rotate. The piston rod 380 on hydraulic cylinder 360 would be in a retracted position, so as to allow yoke 290 to be lowered, thereby lowering hanger members 280 and the connected brushes. The brushes preferably rotate in opposite directions so that opposing lateral edges of a gravestone would have any grass thereon lifted up and off the face of the gravestone. In FIG. 3, brush A would rotate in a counterclockwise direction, while brush B would rotate in a clockwise direction. FIG. 4 shows the brushes 180 in an upward position for travel between grave markers, in which case hydraulic motors 190 would normally be turned off if the next grave marker was a significant distance away, or left operating if the next grave marker was just a short distance away. In this upward position, the piston rod 380 on hydraulic cylinder 360 would be in an extended position, so as to raise yoke 290, thereby raising hanger members 280 and the connected brushes. In travel between the upward or downward positions of the brushes, the various pivoted connections described earlier enable the brushes to move in an almost perfect vertical manner while still maintaining the necessary structural connections between the brushes and the backbone 50 of the present invention.

Referring now to FIGS. 7 through 11, the grass cutting device 40 used in accordance with the present invention is shown. The grass cutting device 40 comprises a mower deck 410 which includes a housing 420 having a grass chute 430 on its forward edge. Each of two hydraulic motors 440 drive a respective rotary cutting blade (not shown) beneath the deck 410 by way of a respective drive belt 450 and pulley 460. Each of the pulleys 460 is connected to its conventional rotary cutting blade by a conventional drive shaft (not shown) with both blades rotating so that any cut grass is directed out through grass chute 430. It has been found that the use of one front guide wheel 470 extending from the forward edge of the mower deck 410, a rear wheel (not shown) in the center of the rear of the deck along the same pivot line as front guide wheel 470, and two rear guide wheels 480 attached at either lateral edge on the rear of the mower deck provide adequate stability and manueverability of this grass cutting portion of the grass trimming apparatus of the present invention.

Figure 9:
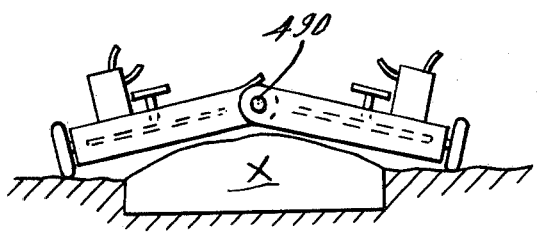
FIG. 9 is a view of the mower decks shown in FIG. 8 in an articulated position to accommodate an obstacle or convex grave marker.

As best seen in FIG. 9, the mower deck 410 may generally be considered to be divided into two halves by way of a horizontal axis or pivot 490. As shown in this figure, the mower deck may be articulated to accommodate an obstacle or convex grave marker X. Such pivotal action occurs more or less automatically whenever an obstacle is engaged, without any necessity of control by the operator of the grass trimming apparatus of the present invention.

Each half of the mower deck 410 is pivotally connected via deck mounting tabs 500 to a respective connecting arm 510 which is generally in the shape of a boomerang, and which has its other end pivotally connected to the open end of a respective fork member 520. The two fork members 520 extend generally vertically and are pivotally connected at their upper closed ends to horizontal mounting bar 530. The two fork members 520 are also connected intermediate their length by a horizontal support bar 540 which is welded to each of the fork members at its ends. Horizontal support bar 540 provides structural support and also insures that the fork members 520 move in unison when pivotal movement occurs with respect to mounting bar 530.

As best seen in FIGS. 10 and 11, extending from the lower side of mounting bar 530 at either of its lateral ends is an alignment member 550. Each alignment member 550 is welded to mounting bar 530 and provides a vertical backstop or alignment surface for the upper portions of fork members 520. A connecting pin 560 extends through each of the mated pair of fork members 520 and alignment members 550 and has a coil spring 570 secured on its one end. During normal travel on level surfaces (FIG. 10), fork member 520 is urged into vertical side by side contact with alignment member 550. However, when an obtacle Y is engaged as in FIG. 11, mower deck 410 and fork member 520 are free to move by way of the various pivotal connections therebetween to function like a shock absorbing mechanism. FIG. 11 shows fork member 520 moved outwardly along connecting pin 560 with its lower portion pivoted away from alignment member 550 so that coil spring 570 is compressed and ready to move fork member 520 back into a vertical orientation once the obstacle is removed or passed over.

Welded on to the middle of the upper surface of mounting bar 530 is a vertical member 580 which has its upper end welded on to the central backbone 50 of the grass trimming apparatus of the present invention. Mower deck 410 is suspended from the central backbone 50 so that it can be easily raised and lowered from non-operating and operating orientations, respectively. Two hanger cables or rods 590 are used to suspend one half of the mower deck 410 from a control arm 600, while two additional hanger cables or rods 610 are used to suspend the other half of the mower deck 410 from another control arm 620 on the opposite side of central backbone 50. Control arms 600 and 620 are connected together at their respective ends opposite the hanger cables 590 and 610, by a pivot rod 630 which is welded to each of the control arms. The pivot rod 630 is itself pivotally mounted on the central backbone 50 by way of mounting tabs 640, which allow the ends of the control arms faastened to the hanger cables to move from the lowered position shown in FIG. 7 to the raised position shown in FIG. 8. This movement of the control arms and hanger cables is caused by action of a piston rod 650 which is part of hydraulic cylinder 660. Hydraulic cylinder 600 is itself pivotally mounted on the central backbone 50 by mounting tabs 670 and, like the hydraulic cylinder 360 used with the grass lifting portion of the present invention described earlier, is preferably of the double-acting type. The piston rod 650 is pivotally connected at its outermost end to a mounting bracket 680 which is welded across the upper surfaces of control arms 600 and 620 adjacent pivot rod 630. The uppermost edge of mounting bracket has a coil spring 690 attached at either of its lateral ends. These springs 690 are secured to the outer casing or mounting area around the other hydraulic cylinder 360 so as to urge control arms 600 and 620 into a normally raised position. When piston rod 650 is fully retracted, springs 690 maintain tension on control arms 600 and 620, and in turn on hanger cables 590 and 610, so as to lighten the weight of the mower deck to the ground, and allow floating action of the mower deck.

Figure 7:
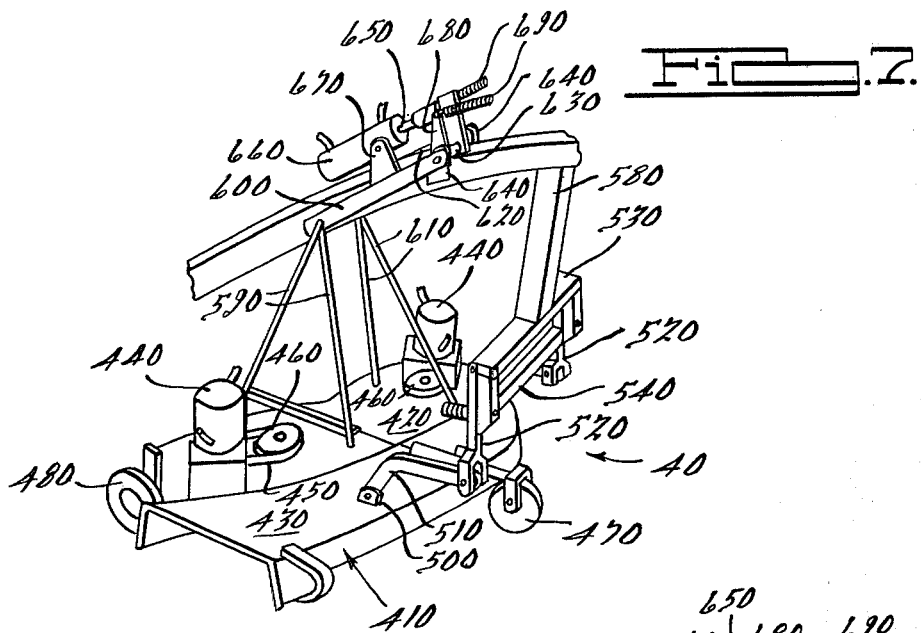
FIG. 7 is a view showing a grass cutting device used in accordance with the present invention in a downward operative position.
Figure 8:
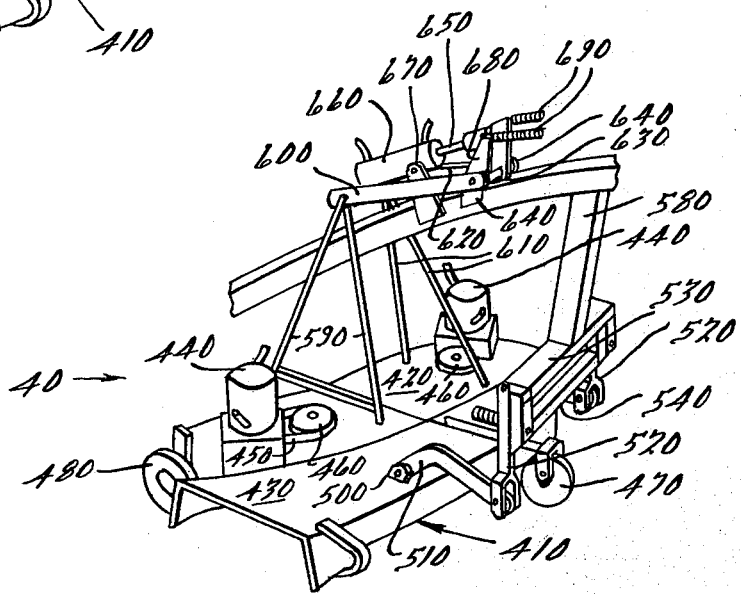
FIG. 8 is a view showing the grass cutting device of FIG. 7 in an upward non-operative position.

In operation, the grass cutting device 40 used in accordance with the present invention is hydraulically controlled by the driver of the tractor 20, like the grass lifting device 30 described earlier. FIG. 7 shows the mower deck 410 in a downward operative position, in which case hydraulic motors 440 would normally be operating to cause the rotary blades of the mower deck to rotate and cut grass. The piston rod 650 on hydraulic cylinder 660 would be in a retracted position, so as to allow control arms 600 and 620 to be lowered, thereby lowering both pairs of hanger cables or rods, 590 and 610, and the connected mower deck. FIG. 8 shows the mower deck 410 in an upward non-operating position, in which case hydraulic motors 400 would normally be turned off in the interest of safety since the mower deck 410 is raised up off the ground and the cutting blades thereunder may be dangerously exposed. In this upward position, the piston rod 650 would be in an extended position so as to raise control arms 600 and 620, thereby raising both pairs of hanger rods, 590 and 610, and the connected mower deck. As with the grass lifting device 30 described earlier, in travel between the upward or downward positions of the mower deck, the various pivoted connections described in the preceding paragraphs enable the mower deck to move in an almost perfect vertical manner while still maintaining the necessary structural connections between the mower deck and the backbone 50 of the present invention.

From the foregoing description, it should be apparent that the present invention provides a grass trimming apparatus which is able to easily trim and clean grass on and around cemetary grave markers, as well as trim grass elsewhere in a cemetary. It is also contemplated that the present invention may be useful in trimming grass and/or digging loose dirt and stones around the edges of other types of pavement, including sidewalks, driveways, roads, and the like. From one location on a tractor, an operator of the present invention can readily control several functions of the grass trimming apparatus of the present invention, including raising and lowering brushes, raising and lowering the mower deck, turning the brushes on and off, as well as turning the mower deck on and off. This number of functions would normally necessitate physical movement of an operator to change the operating modes of these machines, which machines would normally themselves be totally separate units.

The use of a pair of counter-rotating brushes which dig loose dirt and stones and lift grass and thatch-like material up and off the peripheral edges of flush mounted grave markers, and then the use of a grass cutting device in combination with the aforesaid brushes and mounted sequentially thereto so as to be operable to cut the grass lifted by the brushes, is believed to present an efficient, labor-saving device for use by cemetary grounds keepers and other lawn maintenance persons alike. Since the entire grass trimming apparatus of the present invention may be transpositioned between an operating orientation alongside the associated motive vehicle or tractor, and a traveling position disposed rearwardly of the vehicle, the present invention is extremely attractive for those who need to move such grass trimming apparatus between various job sites by way of truck and trailer or the like.

The present invention is believed to be adapted for easy serviceability since the brushes are detachable and since the mower deck is of a conventional type requiring no special expertise for service or maintenance. In addition, the hydraulic operating system described for use in the preferred embodiment of the present invention provides an energy efficient source of power. However, as noted above, other conventional power sources such as gasoline engines or the like may also be used with the present invention.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A grass trimming apparatus for use in trimming grass around a flush mounted horizontal surface comprising:
    a grass lifting device comprising a pair of counterrotating brushes mounted on spaced parallel axes and adapted to contact the flush mounted horizontal surface to clean the surface and lift grass up and off the peripheral edges of the surface, said axes of said brushes being arranged at a generally acute angle to the direction of movement of said apparatus and
    a grass cutting device mounted sequentially to said grass lifting device so as to be operable to cut grass which has been lifted up and off the peripheral edges of the flush mounted horizontal surface.

2. The invention of claim 1 wherein said brushes are detachable from said grass trimming apparatus.

3. The invention of claim 1 wherein said grass lifting device is movable from a downward operative position to an upward position in which no contact is made with the flush mounted horizontal surface.

4. The invention of claim 1 wherein said grass cutting device comprises a rotary mower.

5. The invention of claim 1 wherein said grass cutting device is movable from a downward operative position to an upward position in which no grass is cut.

6. The invention of claim 1 wherein said grass trimming apparatus is attached to a motive vehicle.

7. The invention of claim 6 wherein said motive vehicle is a tractor.

8. The invention of claim 6 wherein said grass lifting device and said grass cutting device are transpositionable between an operating orientation alongside the associated motive vehicle to a traveling or storage position disposed rearwardly of the vehicle.

9. A grass trimming apparatus adapted for attachment to a motive vehicle such as a tractor for use in trimming grass around flush mounted grave markers or the like comprising:
    a pair of detachable counter-rotating brushes adapted to contact the top surface of the grave marker to clean the surface and lift grass up and off the peripheral edges of the grave marker, said brushes being mounted on spaced parallel axes and being movable from a downward operative position to an upward position in which no contact is made with the top surface of the grave marker said axes of said brushes being arranged at a generally acute angle to the direction of movement of said apparatus,
    a rotary mower mounted sequentially to said pair of counter-rotating brushes so as to be operable to cut grass which has been lifted up and off the peripheral edges of the grave marker, said rotary mower being movable from a downward operative position to an upward position in which no grass is cut, and
    said pair of counter-rotating brushes and said rotary mower being transpositionable between an operating orientation alongside the tractor and a traveling or storage position disposed rearwardly of the tractor.

10. The invention of claim 9 wherein said grass trimming apparatus is hydraulically operated.

11. The invention of claim 9 wherein said pair of brushes are removable.

12. The invention of claim 9 wherein said rotary mower comprises first and second articulated mower sections which are pivotable relative to one another in response to said mower traversing an irregular surface.

* * * * *